(No Model.) 2 Sheets—Sheet 1.
C. S. LEDDELL.
BICYCLE.
No. 319,983. Patented June 16, 1885.
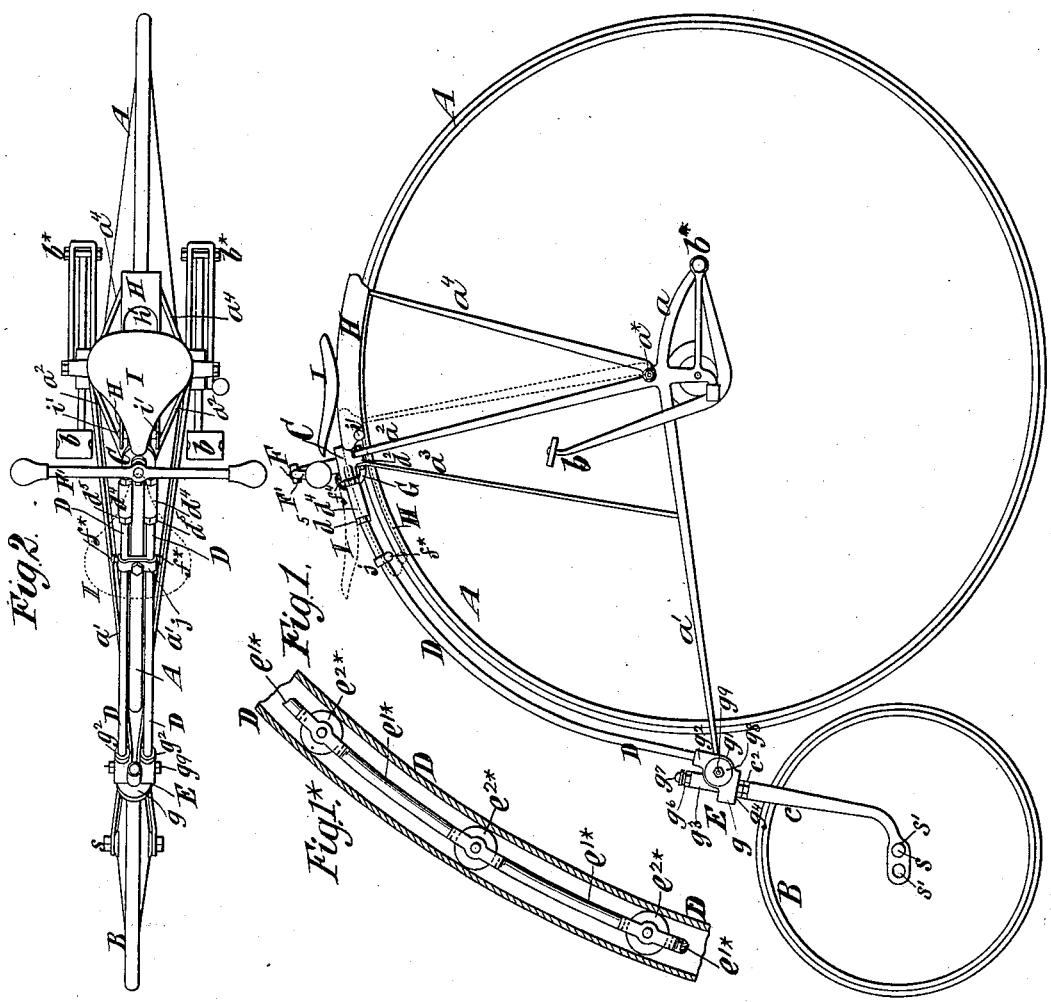
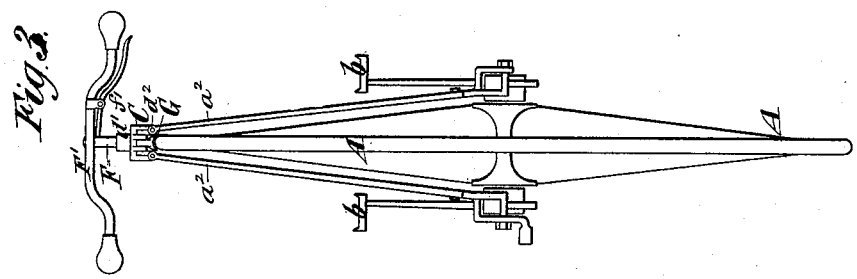
Witnesses:
E. C. Perkins.
Matthew Pollock
Inventor:
Charles S. Leddell
by his Attys.
Brown & Hall

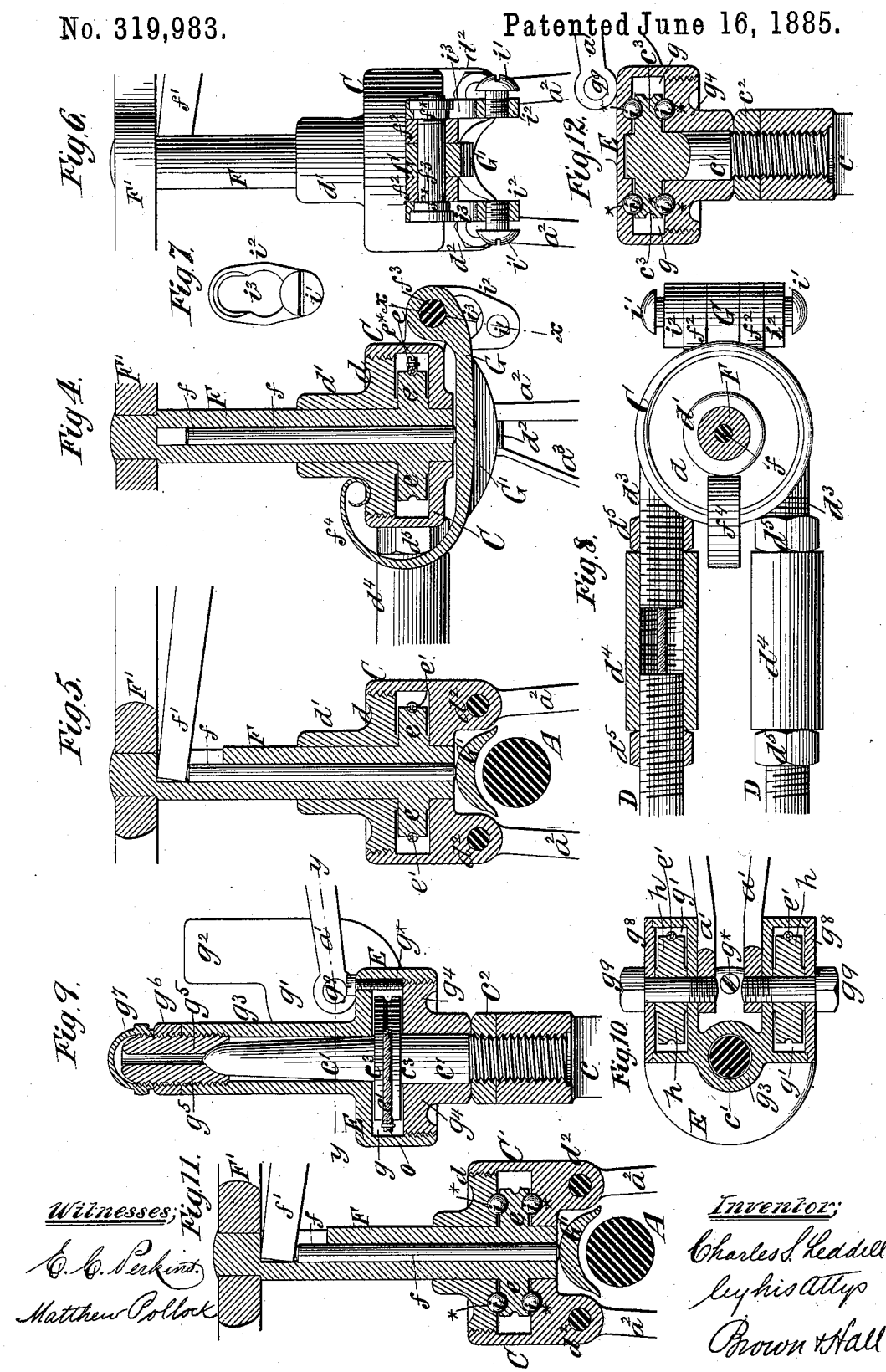

UNITED STATES PATENT OFFICE.

CHARLES S. LEDDELL, OF MORRISTOWN, NEW JERSEY.

BICYCLE.

SPECIFICATION forming part of Letters Patent No. 319,983, dated June 16, 1885.

Application filed November 14, 1884. (No model.)

*To all whom it may concern:*

Be it known that I, CHARLES S. LEDDELL, of Morristown, in the county of Morris and State of New Jersey, have invented a certain new and useful Improvement in Bicycles, of which the following is a specification.

My invention is applicable to bicycles, whether the smaller or steering wheel is in front or behind, and whether the larger or driving wheel is operated by cranks or by a treadle and ratchet movement; and it relates to a bicycle of the kind shown and described in my United States Letters Patent No. 306,498, dated October 14, 1884. In that bicycle the driving-wheel is journaled in or supports a fixed frame, from which extends a hollow curved backbone conforming to the curvature of the wheel, and having arranged within and operating through the said hollow curved backbone flexible connections for transmitting from the steering shaft or spindle to the steering-wheel shaft or fork the movements necessary in steering.

At the upper end of the backbone, which may consist of a single tube or two or more tubes, is a box or frame which is connected with the fixed frame of the driving-wheel, and in which is journaled the steering shaft or spindle, and at the lower end of the backbone is a box or frame which comprises a bearing for the steering-wheel shaft or fork and contains the sheaves or pulleys employed with the flexible steering-connections, and to which are attached other parts of the said fixed frame. The steering shaft or spindle is hollow and has movable lengthwise within it a rod or push-pin, whereby the brake is applied to the driving-wheel.

My present invention consists in a novel construction of the box or frame at the lower end of the backbone, and the bearing therein for the steering-wheel shaft or fork; in a novel combination, with said box or frame, of braces attached thereto and forming a part of the fixed frame of the driving-wheel; also, in a novel combination, with the box or frame at the upper end of the backbone, of the tube or tubes forming the backbone, whereby the tube or tubes and box or frame are so connected that ready provision is afforded for elongating or contracting the backbone; also, in a novel construction of brake and brake-relieving spring, and in the combination of the same with the box or frame at the upper end of the backbone; also, in a novel combination of the box or frame at the upper end of the backbone with the fixed frame of the driving-wheel; also, in a novel construction of dust-guard on which the seat is supported, and in the combination therewith of novel means for supporting and connecting the dust-guard, whereby provision is afforded for adjusting the said guard to bring the seat in proper position for using the machine with the small steering-wheel in front or behind, and for relieving the rider from the effects of the jumping of the steering-wheel, and consequent jars to which he is ordinarily subjected by the steering-wheel passing over slight obstructions, all as more fully hereinafter described, and pointed out in the claims.

In the accompanying drawings, Figure 1 is a side elevation, Fig. 2 a plan, and Fig. 3 a rear elevation, of a bicycle embodying my invention. Fig. 1* is a detail sectional view, hereinafter referred to. Fig. 4 is a vertical section in the plane of the driving-wheel, of the upper box or frame, the brake and appurtenances. Fig. 5 is a similar section of the same parts in a plane transverse to or axially of the driving-wheel. Fig. 6 is a sectional view on the plane of the dotted line $x\ x$, Fig. 4. Fig. 7 is a face view of one of the links or swinging arms for supporting the dust-guard. Fig. 8 is a plan, partly in horizontal section, of the upper box or frame. Fig. 9 is a vertical section of the lower box or frame and its bearing for the steering-wheel shaft or fork. Fig. 10 is a horizontal section on the plane of the dotted line $y\ y$, Fig. 9. Fig. 11 is a vertical section on the same plane as Fig. 5, illustrating a modification of my invention; and Fig. 12 is a vertical sectional view of the lower box or frame, illustrating a modification of my invention. Figs. 4 to 12, inclusive, are drawn to a much larger scale than Figs. 1, 2, and 3, and in all the figures similar letters of reference designate corresponding parts.

A B designate, respectively, the large driving-wheel and the smaller steering-wheel. I have only shown the wheels in outline, as they form no part of my invention; but they may be of any known or suitable construction.

The driving-wheel A is arranged in or supports a fixed frame, which is to be of light and strong construction, and which comprises the portions $a\ a'\ a^2\ a^3$, which are fixed relatively to each other and are on both sides of the wheel A. As before stated, the wheel A might be driven by cranks; but I have here shown the treadles $b$, which are pivoted at $b^*$, and through a suitable ratchet movement, forming no part of my invention and not here illustrated, said treadles turn the wheel.

At the top of the fixed frame and supported thereby is a box or frame, C, hereinafter described in detail, and from which extends the backbone D, which is hollow and curved to conform to the curvature of the large driving-wheel A. As here shown, the backbone consists of two tubes.

At the lower end of the backbone is a box or frame, E, in which the ends of the tubes D are fixed, and in which is journaled the steering-wheel shaft or fork $c$. Through this bifurcated shaft or fork and the steering-wheel the lower end of the backbone is supported.

The construction of the upper box or frame, C, is clearly shown in Figs. 4, 5, 6, and 8. It consists of an approximately-circular body, open at the top and there closed by a plug, $d$, from which a sleeve or hub, $d'$, extends upward. The plug, cap, or bonnet $d$ may be screwed in or otherwise secured in the body C. At the bottom of the box are downwardly-extending ears or lugs $d^2$, to which are secured by bolts the top ends of the upwardly-extending portions $a^2\ a^3$. In this way the box or frame C is supported on the fixed frame of the driving-wheel.

On the box or frame C are rearwardly-extending parallel necks or portions $d^3$, and the upper ends of the backbone-tubes D may be connected therewith, as shown in Fig. 8. The backbone-tubes D and the necks $d^3$ are threaded, respectively, right and left hand, and are connected by sleeves or nuts $d^4$, having internal corresponding threads. By turning these nuts or sleeves $d^4$ the tubes may be in effect lengthened or shortened to properly fix the length of the backbone. The nuts or sleeves $d^4$ are fixed after adjustment by jam-nuts $d^5$.

In the box or frame C is journaled a steering shaft or spindle, F, surmounted by a steering-handle, F', and having rigidly secured to or formed upon it a sheave or pulley, $e$, which is arranged within the box or frame. The steering shaft or spindle F has bearings in the box C and in the sleeve $d'$.

Around the sheave or pulley $e$ is passed an endless wire rope or other flexible connection, $e'$, which is attached securely to the sheave $e$ by a screw, $e^*$, or otherwise, and when the steering shaft or spindle F is turned the movement is transmitted through the flexible connections $e'$, which extend through the backbone D. The steering shaft or spindle F is hollow, and therein is arranged a push rod or pin, $f$, which may be pushed down by means of the brake-applying handle $f'$. (Best shown in Figs. 3 and 5.)

G designates the brake, which consists of a piece of metal of the form best shown in Fig. 4, and having its shoe portion G' rounded or concaved transversely to fit the rim of the wheel A. The box or frame C is formed with rearwardly-projecting lugs or ears $f^2$, and the brake is secured between them by a bolt or pin, $f^3$. The front portion of the brake G is thinned and curved upward and rearward to form a spring portion, $f^4$, which bears on the top of the box C. The spring thus formed resists any downward movement of the brake, and raises it off the wheel when relieved or released. The spring $f^4$ may be a separate piece, riveted to part G, if desired. The push rod or pin $f$, when pushed down by the handle $f'$, serves to depress the brake, and when the handle is released the brake and push-rod are returned by the spring portion $f^4$.

The construction of the lower box or frame is best shown in Figs. 9 and 10. It comprises a cavity, $g$, having its axis nearly vertical, and two cavities, $g'\ g'$, having horizontal axes. From the cavities $g'$ necks or sockets $g^2$ extend upward and receive the ends of the tubes D.

Concentric with the cavity $g$ is an upwardly-extending sleeve, $g^3$, and the said cavity is closed on the under side by a plug, cap, or bonnet, $g^4$, which may be screwed thereinto, the inward movement of the cap or bonnet being limited by a screw, $g^*$. (Shown in Fig. 9.)

The steering-wheel shaft $c'$ is, as here shown, made separate from the fork $c$, and is screwed thereinto, a jam-nut, $c^2$, being employed to secure the fork against displacement. In the top of the sleeve $g^3$ is screwed a plug, $g^5$, having an oil-hole extending through it, and capable of adjustment to come to a bearing on the top of the steering-wheel shaft $c'$. The plug $g^5$ is secured in position after adjustment by a jam-nut, $g^6$, and is covered at the upper end by a cap-nut, $g^7$. The plug $g^5$ forms a thrust-bearing to receive the strain, and is adjustable to compensate for wear. The cap or bonnet $g^4$ is screwed in to hold the shaft $c'$ to the thrust-bearing, and its inward movement is limited by the screw $g^*$.

The cavities $g'\ g'$ are closed on their outer sides by caps or bonnets $g^8$, which are properly centered therein, and in each cavity is a sheave, $h$, journaled on the pin or bolt $g^9$, that secures the cap or bonnet $g^8$ in place. The forwardly-extending portions $a'$ of the fixed frame are prolonged to the box or frame E, and are each secured by a pin or bolt, $g^9$, as best seen in Fig. 10.

When the backbone consists of a single tube, as shown in my aforesaid patent, the cavities $g'$ and sheaves $h$ would converge toward the driving-wheel, and in such case the ends of the frame portions $a'$ would be secured on the outer sides of the cavities $g'$ with their caps or bonnets. On the shaft $c'$ is rigidly secured or formed a sheave or pulley, $c^3$, and the flexible connections $e'$, which extend through the backbone, are deflected around the sheaves $h$, and are secured to the sheave or pulley $c^3$ at $o$; hence it will be clear that any turning movement of the steering-shaft F will be transmitted through the cords or flexible connections $e'$ to the steering-wheel shaft $c'$, which it will turn correspondingly.

It will be observed that the adjustability of the screw-plug $g^5$ and cap or bonnet $g^4$ serve as a means of bringing the sheave or pulley $c^3$ into proper relation to the sheaves $h$ to insure the proper deflection of the flexible connections $e'$.

In Fig. 11, I have shown a modified construction of the upper box or frame, C. I have there shown the sheave $e$ and the surfaces of the box or frame and cap $d$, which are adjacent to the sheave or pulley, as having formed in their coincident sides grooves or annular seats *, wherein are set or placed a series of little balls or spheres, $i$, which constitute anti-friction rollers and tend to reduce the frictional resistance to the turning of the shaft F. Fig. 12 also shows a similar modification of the lower box or frame, E. In this example of the invention the sleeve $g^3$ is dispensed with and the top of the cavity $g$ in the box or frame is closed. In the sheave or pulley $c^3$ and adjacent surfaces of the box or frame E and cap or bonnet $g^4$ are grooves or annular seats *, and therein are arranged little spheres $i$, forming anti-friction rollers, as above described.

At the top of the driving-wheel A is the dust-guard H, which covers the rim of the wheel and is attached to rods or braces $a^4$, which form a part of the fixed frame, and are pivoted at $a^*$.

The manner of supporting the front end of the dust-guard H is peculiar. At its front end it is attached, by pins or screws $i'$, to links or swing-pieces $i^2$, which are shown best in Figs. 4, 6, and 7. The pin or bolt $f^3$, which supports the brake G, has its heads rabbeted at $f^*$ on their inner sides, and the links or swing-pieces $i^2$ are cut out at their middle part, $i^3$, so as to pass over the heads of the bolt or pin $f^3$, and are rabbeted on their outer sides and in their upper part to fit the rabbeted heads of said pin or bolt.

On the dust-guard is supported the seat I, and it will readily be seen that the swinging support which the links $i^2$ give to the dust-guard and seat prevent the transmission to the seat of the shocks or jars produced by the passage of the steering-wheel B over slight obstructions.

The dust shield or guard H is slotted or cut away at $h'$ in its top portion, and consequently may be swung into the position shown by dotted lines in Fig. 1, the slot permitting the dust-shield to pass on opposite sides of the box or frame C.

Attached to the tubes D is a clamp or clasp, $j$, which is provided with studs having rabbetted heads, $f^*$, similar to the heads of the pin or bolt $f^3$. To shift the dust shield or guard H, it is only necessary to raise the forward end to disengage the links $i^2$ from the heads $f^*$, and then move the shield ahead and hook the links upon the studs $f^*$, which are on the clamp $j$. The saddle I may then be reversed in position, as shown by dotted lines in Fig. 1.

It will be seen by reference to Fig. 1 that the axis $s$ of the steering-wheel B is not intersected by the axis of the steering-wheel shaft $c'$, but is considerably forward of the axis of said shaft; hence it will be seen that by turning the shaft $c'$ and fork $c$ the bearing-point of the wheel B on the ground will be shifted to one side or other of the wheel A, and the rider may thus prevent himself from falling sidewise. This provision may be still further increased by providing in the fork $c$ two or more holes, $s'$, in any one of which the axle or pin S may be inserted. When the machine is to be used with the larger wheel, A, in front, the dust-guard H and braces $a^4$ may be entirely removed, and the saddle I attached directly to the backbone D.

As before stated, the connections $e'$, which extend through the backbone D, may be of wire, wire rope, or other flexible material; but, if desired, those parts only which pass around the sheaves may be made of such material, and the portions which pass through the tubes D may consist of curved rods $e'^*$, as shown in Fig. 1*. These rods $e'^*$ may be provided with anti-friction rollers $e^{2*}$, as also shown in Fig. 1*, to reduce friction in the tubes D.

What I claim as my invention, and desire to secure by Letters Patent, is—

1. The combination, with the curved hollow backbone, and the box or frame E at the lower end thereof, having the cavities $g'\ g'$, and the sheaves $h$, arranged therein, of the fixed frame comprising forwardly-extending portion $a'$, and screws or bolts $g^9$, forming the pivots for the sheaves $h$, and securing the frame portions $a'$, substantially as herein described.

2. The combination, with the curved hollow backbone D, of the lower box or frame, E, having cavities $g'\ g'$, closed by caps or bonnets $g^8$ on their outer sides, of the fixed frame having the portions $a'$ extending forwardly to the inner side of the box or frame E, sheaves $h$ in the cavities $g'$, and bolts or screws $g^9$, each serving to secure a cap or bonnet, $g^8$, and frame portion $a'$, and as a pivot for a sheave, $h$, substantially as herein described.

3. The combination, with the driving and steering wheels, the fixed frame for the driving-wheel, a curved hollow backbone and flexible steering-connections arranged therein, of the steering-wheel shaft $c'$ and its sheave $c^3$, the lower box or frame having a cavity, $g$, for said sheave, and an upwardly-extending sleeve forming an upper bearing for the shaft $c'$, and a cap or bonnet, $g^4$, forming a lower bearing for said shaft, substantially as herein described.

4. The combination, with the driving and steering wheels, the fixed frame for the driving-wheel, a curved hollow backbone and flexible steering-connections arranged therein, of the steering-wheel shaft $c'$, the lower box or frame having a cavity, $g$, and upwardly-extending sleeve $g^3$, forming an upper bearing for said shaft, the adjustable plug $g^5$, forming a thrust-bearing for the upper end of said shaft, and the cap or bonnet $g^4$, forming a lower bearing for said shaft, substantially as herein described.

5. The combination, with driving and steering wheels, the fixed frame and hollow curved backbone, and flexible steering-connections extending through the backbone, of the steering-wheel shaft $c'$ and sheave $c^3$, the box or frame having the cavity $g$ and sleeve $g^3$, the cap or bonnet $g^4$, the adjustable plug or thrust-block $g^5$, perforated for oil, and the jam-nut $g^6$ and cap-nut $g^7$, applied to said plug $g^5$, substantially as herein described.

6. The combination, with the driving and steering wheels, hollow curved backbone, and flexible steering-connections arranged therein, of the box or frame C at the upper end of said backbone, and a fixed frame for the driving-wheel, comprising upwardly-extending portions $a^2$ $a^3$, attached to the said box or frame at $d^2$, substantially as herein described.

7. The combination, with the driving and steering wheels, and the fixed frame for the driving-wheel, of the upper box or frame, C, having forwardly-extending necks $d^3$, the curved tubes D, forming the backbone, the nuts or threaded sleeves $d^4$, adjustably connecting the necks and tubes, and the jam-nuts $d^5$, substantially as herein described.

8. The combination, with the driving and steering wheels, the hollow steering-shaft, and a push-rod extending through said shaft, of a brake, G, pivoted at one end and having its opposite end curved upward and constituting a spring portion, $f^4$, substantially as herein described.

9. The combination, with the driving and steering wheels, the hollow steering-shaft, the curved backbone, and the box or frame C at the upper end thereof, of the brake G, pivoted at $f^3$, and having its opposite end curved to form a spring portion, $f^4$, resting upon the box or frame, the push-rod extending through said shaft, and the brake-applying handle, substantially as herein described.

10. The combination, with the driving and steering wheels, the fixed frame, and curved backbone having a box or frame, C, at its upper end, of a seat-support and links or swing-pieces connecting its end with the said box or frame C, substantially as herein described.

11. The combination, with the driving and steering wheels, the fixed frame, the curved backbone and its upper box or frame, C, provided with pairs of rabbeted studs or heads $f^*$, of the dust-guard H and the rods or braces $a^4$ for supporting one end thereof, and the links or swing-pieces $i^2$, slotted and rabbeted as described, and capable of engagement with either pair of rabbeted studs or heads, substantially as herein described.

C. S. LEDDELL.

Witnesses:
FREDK. HAYNES,
MATTHEW POLLOCK.